United States Patent
Wong et al.

(10) Patent No.: US 12,363,742 B2
(45) Date of Patent: Jul. 15, 2025

(54) DYNAMIC PRIVATE WI-FI CHANNEL SELECTION

(71) Applicant: ROKU, INC., San Jose, CA (US)

(72) Inventors: Allen Wong, San Jose, CA (US); Tito Thomas, San Jose, CA (US); Jiny Bradshaw, San Jose, CA (US); Amalavoyal Narasimha Chari, San Jose, CA (US)

(73) Assignee: Roku, Inc., San Jose, CA (US)

( * ) Notice: Subject to any disclaimer, the term of this patent is extended or adjusted under 35 U.S.C. 154(b) by 300 days.

(21) Appl. No.: 17/886,964

(22) Filed: Aug. 12, 2022

(65) Prior Publication Data

US 2023/0092595 A1 Mar. 23, 2023

Related U.S. Application Data

(60) Provisional application No. 63/246,729, filed on Sep. 21, 2021.

(51) Int. Cl.
*H04W 36/08* (2009.01)
*G08C 17/02* (2006.01)
*H04W 72/52* (2023.01)
*H04W 84/12* (2009.01)

(52) U.S. Cl.
CPC .......... *H04W 72/52* (2023.01); *G08C 17/02* (2013.01); *H04W 84/12* (2013.01)

(58) Field of Classification Search
CPC . H04W 72/52; H04W 84/12; H04W 72/0453; G08C 17/02
See application file for complete search history.

(56) References Cited

U.S. PATENT DOCUMENTS

| | | | | |
|---|---|---|---|---|
| 2018/0279130 A1* | 9/2018 | Huang | ............. | H04W 72/0453 |
| 2018/0310279 A1* | 10/2018 | Pathak | ................. | H04W 16/02 |
| 2019/0037460 A1* | 1/2019 | Bhattacharya | .... | H04W 36/0072 |
| 2019/0045372 A1* | 2/2019 | Niu | .................... | H04W 56/0015 |
| 2019/0281608 A1* | 9/2019 | Huang | ................. | H04W 16/00 |
| 2020/0322676 A1* | 10/2020 | Chamberlin | ............ | G06F 16/78 |

* cited by examiner

*Primary Examiner* — Lan-Huong Truong
(74) *Attorney, Agent, or Firm* — Sterne, Kessler, Goldstein & Fox P.L.L.C.

(57) ABSTRACT

A method for switching channels of communication between a host or media device and a peripheral device includes steps for detecting a trigger condition for performing a channel switch operation of a currently selected channel. The currently selected channel may be one of a plurality of channels that can be used by the media device to communicate with the peripheral device. For example, the host device may select a predefined channel (e.g., for a hard-coded channel selection) or a candidate channel (e.g., for a dynamic channel selection) from the plurality of channels. The host device may determine whether it is configured for performing a dynamic channel switch based on channel scores associated with channels in the plurality of channels.

18 Claims, 7 Drawing Sheets

DYNAMIC PRIVATE WI-FI CHANNEL SELECTION

CROSS-REFERENCE TO RELATED APPLICATIONS

This application claims priority to U.S. Provisional Patent Application No. 63/246,729, filed Sep. 21, 2021, titled "Dynamic Private Wi-Fi Channel Selection" the contents of which are hereby incorporated herein by reference in its entirety.

BACKGROUND

Field

This disclosure is generally directed to improving channel selection between Wi-Fi devices, and more particularly, toward optimizing the selection of Wi-Fi channels of devices within a private peer-to-peer network, such as a Wi-Fi Direct enabled network.

Background

Connections between peripherals, such as remotes, and media players may be implemented using a peer-to-peer (P2P) network where the media player may act as an host device for the P2P network. Some P2P networks, such as Wi-Fi direct, employ channels within a frequency band (e.g., 2.4 GHz, 5 GHz) to send and receive data between P2P devices. In a media environment with multiple devices, there may be multiple networks for communication which may include standard Wi-Fi networks as well as P2P networks. Each of these networks communicate over channels within frequency bands. There are a limited number of channels within frequency bands for communicating within the media environment which leads to devices competing to communicate over frequently utilized channels. This competition leads to network congestion, or interference, and can degrade network performance for devices within those networks.

To mitigate the effects of this interference, devices in the network may switch between channels within the frequency band in the hopes that the new channel may have less network interference. Current methods for switching channels are unsophisticated because they are typically hard-coded into devices and cannot adjust for changing network conditions within the media environment.

What is needed is an improved mechanism for dynamically and seamlessly switch P2P channels for devices communicating within a media environment.

SUMMARY

Provided herein are system, apparatus, article of manufacture, method and/or computer program product embodiments, and/or combinations and sub-combinations thereof, for dynamically switching channels between host devices and connected peripheral devices. Host devices may include media devices. Host devices may be configured in a network to communicate with peripheral devices over a private network such as P2P network and to communicate with access points that provide access to a network such as the Internet. Communications over the P2P network may occur via P2P channels and communications with the access point may occur via access point (AP) channels. Instead of a hard-coded process where channel selection may be preconfigured, the dynamic channel switching provided in this disclosure may take into account current host device and network configuration conditions as well as power-saving conditions associated with the peripheral device and the host device. For example, the dynamic channel switch may be based on a channel score associated with the candidate channel. In some embodiments, the host device may be configured to perform either the hard-coded channel switch or the dynamic channel switch based on particular conditions at the host device.

Some embodiments include a host device detecting a trigger condition for performing a channel switch operation of a channel for communicating between the media device and a peripheral device. The host device may be configured to communicate with the peripheral device over a currently selected P2P channel. The currently selected channel may be one of a plurality of channels that can be used by the media device to communicate with the peripheral device. For example, the host device may select a predefined channel (e.g., for a hard-coded channel selection) or a candidate channel (e.g., for a dynamic channel selection) from the plurality of channels. The host device may determine whether it is configured for performing a dynamic channel switch for the channel switch operation. Responsive to not being configured to perform the dynamic channel switch, the host device may proceed with performing a hard-coded channel switch to switch from the currently selected channel to the predefined channel. But responsive to being configured for performing the dynamic channel switch, the host device may identify the candidate channel based on the channel score associated with the candidate channel and then performing the dynamic channel switch to switch the media device from the currently selected channel to the identified candidate channel.

BRIEF DESCRIPTION OF THE FIGURES

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for dynamically switching Wi-Fi channels of devices within a media environment. Particular embodiments are applicable to peripherals and remote controls that communicate with media devices and display devices over a peer-to-peer (P2P)

network, such as a Wi-Fi direct enabled network. In some embodiments, the dynamic channel switching allows for Wi-Fi channels to be selected based on network metrics of the media environment which may include the P2P network as well as other Wi-Fi networks.

As one example, a media environment may include one or more peripheral devices such as a remote control, one or more media devices such as a set-top box, and one or more access points that provide access to a Wi-Fi network. The peripheral device may communicate with the media device over a private network such as a P2P network between the peripheral and the media device. The communication between the peripheral device and the media device may be implemented via a particular frequency band in the P2P network where the frequency band may include multiple communication channels. In addition, the media device may communicate with an access point, such as a router, over another network such as a Wi-Fi network between the access point and the media device. For clarity, the media device may act as and also be referred to as a host device when communicating with the peripheral over the P2P network. Similar to the communication over the P2P network, the communication over the Wi-Fi network between the media device and the access point may be implemented via a particular frequency band which may also include multiple communication channels. In this manner, the media device may be communicating over one channel in the P2P network with the peripheral and over another channel in the Wi-Fi network with the access point.

In some embodiments, the frequency bands may either be 2.4 GHz, which has 11 channels, each 20 MHz wide or 5 GHz, which has access to more channels than the 2.4 GHz, the number of which is based on the geographical region in which the media environment is established. In some embodiments, channel management may be implemented within the media device that connects to both the private network with the peripherals and to the Wi-Fi network with the network access points.

Various embodiments of this disclosure may be particularly advantageous for improving network performance, especially in P2P networks that involve peripheral devices. Embodiments of this disclosure allow for seamless switching between channels including in situations where the switch is necessitated by internal or external triggers. Non-limiting examples of external triggers include changes non-network configurations of the media device such as changes to hardware or software conditions of the media device such as a boot status of the media device and resuming from a suspend mode. Non-limiting examples of internal triggers may include detected network conditions such as packet drops or changes in network configurations of the media device.

Figure 1:
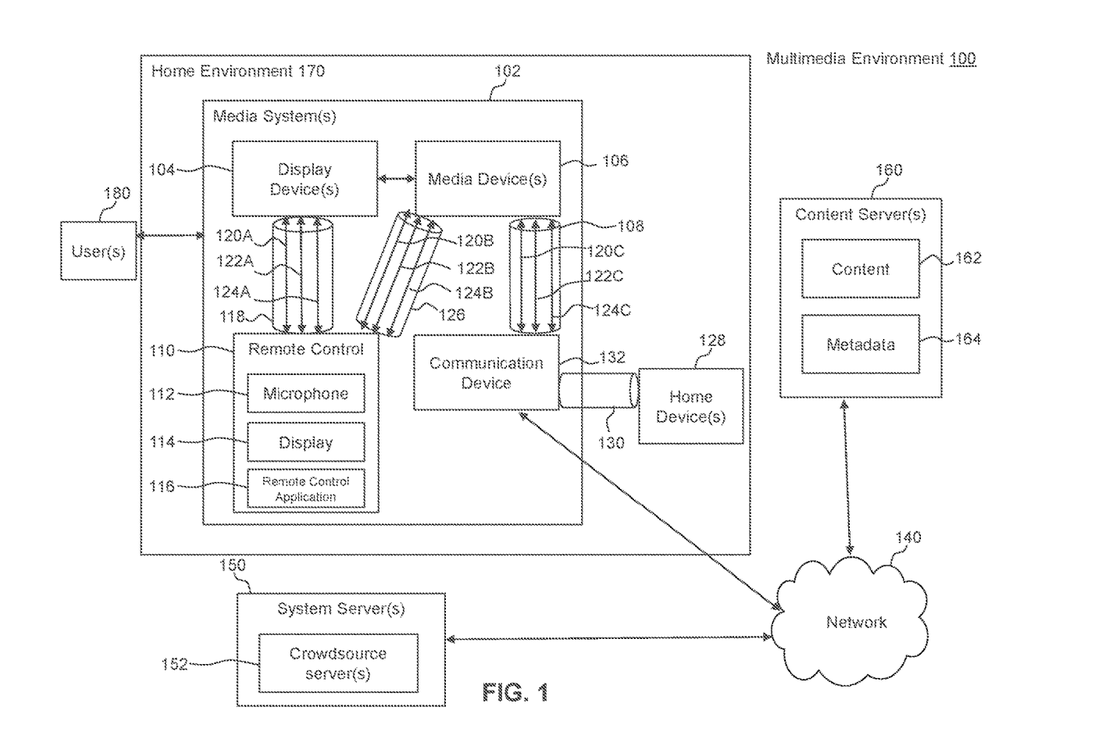
FIG. 1 illustrates a block diagram of a multimedia environment, according to some embodiments.

Various embodiments of this disclosure may be implemented using and/or may be part of a multimedia environment 100 shown in FIG. 1, in some embodiments. It is noted, however, that multimedia environment 100 is provided solely for illustrative purposes, and is not limiting. Embodiments of this disclosure may be implemented using and/or may be part of environments different from and/or in addition to the multimedia environment 100, as will be appreciated by persons skilled in the relevant art(s) based on the teachings contained herein. An example of the multimedia environment 100 shall now be described.

Multimedia Environment

FIG. 1 illustrates a block diagram of a multimedia environment 100, according to some embodiments. In a non-limiting example, multimedia environment 100 may be directed to streaming media across a network, such as from a server (e.g., content server 160) to a media system (e.g., media system 102). However, this disclosure is applicable to any type of media (instead of or in addition to streaming media), as well as any mechanism, means, protocol, method and/or process for distributing media.

The multimedia environment 100 may include one or more media systems 102. A media system 102 could represent a family room, a kitchen, a backyard, a home theater, a school classroom, a library, a car, a boat, a bus, a plane, a movie theater, a stadium, an auditorium, a park, a bar, a restaurant, or any other location or space where it is desired to receive and play streaming content. The media system 102 may be part of a home environment 170 that includes other home device(s) 128 which are not part of the media system 102 but which may, in some embodiments, be connected to the same network as media system 102. For example, devices in media system 102 such as display device 104 and media device 106 and home device(s) 128 may all connect to a network via communication device 132.

User(s) 180 may interact with the media system 102 to select and consume content. For example, user(s) 180 may interact with remote control 110 via a graphical user interface on the remote control 110, physical inputs on the remote control 110, or microphone 112, to select content for streaming.

Each media system 102 may include one or more media devices 106 each coupled to one or more display devices 104. It is noted that terms such as "coupled," "connected to," "attached," "linked," "combined" and similar terms may refer to physical, electrical, magnetic, logical, etc., connections, unless otherwise specified herein.

Media device 106 may be a device that relays media content such as a streaming media device, a set-top box, DVD or BLU-RAY device, audio/video playback device, cable box, a streaming sound bar, and/or digital video recording device, to name just a few examples.

Display device 104 may be a monitor, television (TV), computer, smart phone, tablet, wearable device (such as a watch or glasses), appliance, internet of things (IoT) device, and/or projector, to name just a few examples. In some embodiments, media device 106 can be a part of, integrated with, operatively coupled to, and/or connected to display device 104.

Each media device 106 and each display device 104 may be configured to communicate with network 140 via a communication device 132. The communication device 132 may include, for example, a network interface, a cable modem or satellite TV transceiver. In some embodiments, the media device 106 may communicate with the communication device 132 over a connection 108, wherein the connection 108 may include wireless (such as Wi-Fi) and/or wired connections. Although not shown, the display device 104 may also communicate with communication device 132 through another connection that has multiple channels.

Communication device 132 may also communicate with other home devices 128 within the home environment 170 via connection 130. Although not depicted, connection 130 may also include a number of channels similar to connections 108, 118, and 126 for transmitting data between home devices 128 and communication device 132.

When communicating with remote control 110, display device 104 and media device 106 may be considered host devices for peripherals in media system 102, such as remote control 110. Other examples of peripherals (not shown) in media system 102 may include wireless speakers and subwoofers. Peripherals, including remote control 110, may communicate with media device 106 via one or more channels of connection 126. In such configurations, display device 104 and media device 106 are enabling a direct peer-to-peer communication with remote control 110. As host devices for the peer-to-peer network, display device 104 and media device 106 provide a means for direct communication with other devices within media system 102 such as remote control 110. In this manner, media system 102 may include multiple host devices that provide direct peer-to-peer communications with other devices such as peripheral devices including remote control 110. Communications between remote control 110 and display device 104 and media device 106 may occur without involvement from communication device 132.

In various embodiments, the network 140 can include, without limitation, wired and/or wireless intranet, extranet, Internet, cellular, Bluetooth, infrared, and/or any other short range, long range, local, regional, global communications mechanism, means, approach, protocol and/or network, as well as any combination(s) thereof.

Media system 102 may include a remote control 110. The remote control 110 can be any component, part, apparatus and/or method for controlling the media device 106 and/or display device 104, such as a dedicated remote control, a tablet, laptop computer, smartphone, wearable, on-screen controls, integrated control buttons, audio controls, or any combination thereof, to name just a few examples. In an embodiment, the remote control 110 wirelessly communicates with the media device 106 and/or display device 104 using a private network, such as a P2P network, where media device 106 and/or display device 104 may operate as an access point for the remote control 110.

In an embodiment, remote control 110 may communicate with display device 104 over a connection 118 that may include channels 120A, 122A, and 124A. Although only three channels 120A, 122A, and 124 are shown in FIG. 1, in practice the multimedia environment 100 may include any number of channels; similarly, any number of channels may be implemented in connections 126 and 108. Display device 104 may select any channel (e.g., channels 120A, 122A, and 124A) in connection 118 to transmit and receive communications with remote control 110. As one example, connection 118 may operate in a 2.4 GHz frequency band and channels 120A, 122A, and 124A may be implemented as one of the channels in the 2.4 GHz frequency band such as channels 1, 6, and 11. As another example, connection 118 may operate in a 5 GHz frequency band.

Similarly, remote control 110 may communicate with media device 106 over a connection 126 that may include channels 120B, 122B, and 124B. In some embodiments, connection 126 may operate in a similar or different frequency band as connection 118. For example, connection 126 may operate in the 2.4 GHz frequency band and channels 120B, 122B, and 124B may be different, overlap, or be the same as channels 120A, 122A, and 124A. Media device 106 may select any channel (e.g., channels 120B, 122B, and 124B) in connection 126 to transmit and receive communications with remote control 110.

In some embodiments, display device 104 and media device 106 may have more than one Wi-Fi radio for establishing connections. In such embodiments, display device 104 and media device 106 may be capable of establishing different types of connections with communication device 132 and remote control 110. Types of connections may refer to frequency bands of each connection, such as 2.4 GHz and 5 GHz. For example, display device 104 and media device 106 may include one Wi-Fi radio for establishing a 2.4 GHz connection and a second Wi-Fi radio for establishing a 5 GHz connection. In other embodiments, Wi-Fi radios may be capable of both 2.4 GHz and 5 GHz connections. In such embodiments, both Wi-Fi radios may be operating the same frequency connections (e.g., 5 GHz) at the same time but with channels selected to avoid interference in their communications.

It is possible for devices in media system 102 to select the same channel for communication. For example, display device 104 and media device 106 may both select the same channel (e.g., channel 6) within the same frequency band (e.g., 2.4 GHz). It is also possible for multiple devices in home environment 170 to select the same channel for communication such as home device 128, display device 104, and media device 106 may all select the same channel (e.g., channel 6) within the same frequency band (e.g., 2.4 GHz).

Devices in media system 102 may also be capable of sharing network metric information with each other to improve channel switching. For example, display device 104 and media device 106 may share information regarding a history of selected channels, the network performance after channel switching, and channel scores for channels within home environment 170. In some embodiments, metric sharing may be limited to devices that share a common operating system for increased security. For example, display device 104 and media device 106 may both implement a common media operating system, perform an authorized handshake to ensure privacy of any shared communication, and establish a communication (e.g., private network) for sharing the metric information.

The remote control 110 may include a microphone 112, which is further described below. The remote control 110 may further include a display 114 for displaying a graphical user interface that enables user selection of content to be provided by media device(s) 106. In an embodiment, the graphical user interface is provided by the remote control application 116 installed in remote control 110. Display 114 may be of various size depending on the remote control 110.

The remote control application 116 may be installed on remote control 110 and may be configured to display a user interface for accessing content via media device(s) 106. The user interface may provide any means for allowing user(s) 180 to view, select, and otherwise identify content to be streamed by media device(s) 106. The user interface may include a predefined dimension (e.g., to fit the size of display 114) and predefined configuration that implements particular user interface elements at specific positions in the user interface. For example, the predefined configuration may implement a particular layout for a direction pad, volume controls, and other user interface elements for interacting with media content. The application may further include means for implementing an interface customization parameter that modifies the predefined dimension and/or the predefined configuration by, for example, either reducing the dimension to a smaller size or modifying the layout so that different user interface elements are displayed at different positions of the user interface.

In an embodiment, the remote control application 116 may also include means for monitoring local user interface usage information by user(s) 180. For example, the remote control application 116 may track how often certain user interface elements are utilized and the store this history in memory. These user interface elements include a direction pad and buttons for controlling the media content. In an embodiment, the usage information may be implemented as a ranked list identifying how often certain interface elements are used by user(s) 180. For example, the usage information may indicate that user(s) 180 utilizes the volume buttons—volume up, volume down, mute—more than other interface elements. The application may transmit the usage information to crowdsource server(s) 152.

Buttons may allow users to control playback of media content and provide access to other tools such as user settings, network settings. Another example a user interface element is a slider which may provide more granular control over playback (e.g., rewind or fast forward) or settings (e.g., adjusting volume, brightness, etc.)

The multimedia environment 100 may include a plurality of content servers 160 (also called content providers or sources). Although only one content server 160 is shown in FIG. 1, in practice the multimedia environment 100 may include any number of content servers 160. Each content server 160 may be configured to communicate with network 140.

Each content server 160 may store content 162 and metadata 164. Content 162 may include any combination of music, videos, movies, TV programs, multimedia, images, still pictures, text, graphics, gaming applications, advertisements, programming content, public service content, government content, local community content, software, applications, and/or any other content or data objects in electronic form.

In some embodiments, metadata 164 comprises data about content 162. For example, metadata 164 may include associated or ancillary information indicating or related to writer, director, producer, composer, artist, actor, summary, chapters, production, history, year, trailers, alternate versions, related content, applications, and/or any other information pertaining or relating to the content 162. Metadata 164 may also or alternatively include links to any such information pertaining or relating to the content 162. Metadata 164 may also or alternatively include one or more indexes of content 162, such as but not limited to a trick mode index.

The multimedia environment 100 may include one or more system servers 150. The system servers 150 may operate to support the media devices 106 from the cloud. It is noted that the structural and functional aspects of the system servers 150 may wholly or partially exist in the same or different ones of the system servers 150.

The media devices 106 may exist in thousands or millions of media systems 102. Accordingly, the media devices 106 may lend themselves to crowdsourcing embodiments and, thus, the system servers 150 may include one or more crowdsource servers 152.

For example, using information received from the media devices 106 in the thousands and millions of media systems 102, the crowdsource server(s) 152 may identify similarities and overlaps between closed captioning requests issued by different user(s) 180 watching a particular movie. Based on such information, the crowdsource server(s) 152 may determine that turning closed captioning on may enhance users' viewing experience at particular portions of the movie (for example, when the soundtrack of the movie is difficult to hear), and turning closed captioning off may enhance users' viewing experience at other portions of the movie (for example, when displaying closed captioning obstructs critical visual aspects of the movie). Accordingly, the crowdsource server(s) 152 may operate to cause closed captioning to be automatically turned on and/or off during future streaming of the movie.

Crowdsource server(s) 152 may further include user interface usage information such as how user(s) 180 interact with the user interface provided through their respective remote control 110 including the usage information described above. Crowdsource server(s) 152 may generate crowdsource user interface information that may identify usage history of the user interface for all remote controls that are connected to crowdsource server(s) 152. The crowdsource user interface information may be implemented as a ranked list identifying user interface elements that are most used by a plurality of users across multiple multimedia environments.

Crowdsource server(s) 152 may further include network metric information from various multimedia environments 100. Network metric information may include network performance information for different frequency bands or for different channels, network performance after channel switching which may be used to evaluate the performance of the channel switching decision making. For example, the dynamic channel switching functionality may be implemented in multiple media systems 102 and crowdsource server(s) 152 may collect the network performance provided by these media systems 102 in order to determine the efficacy of the channel switching.

Figure 2:
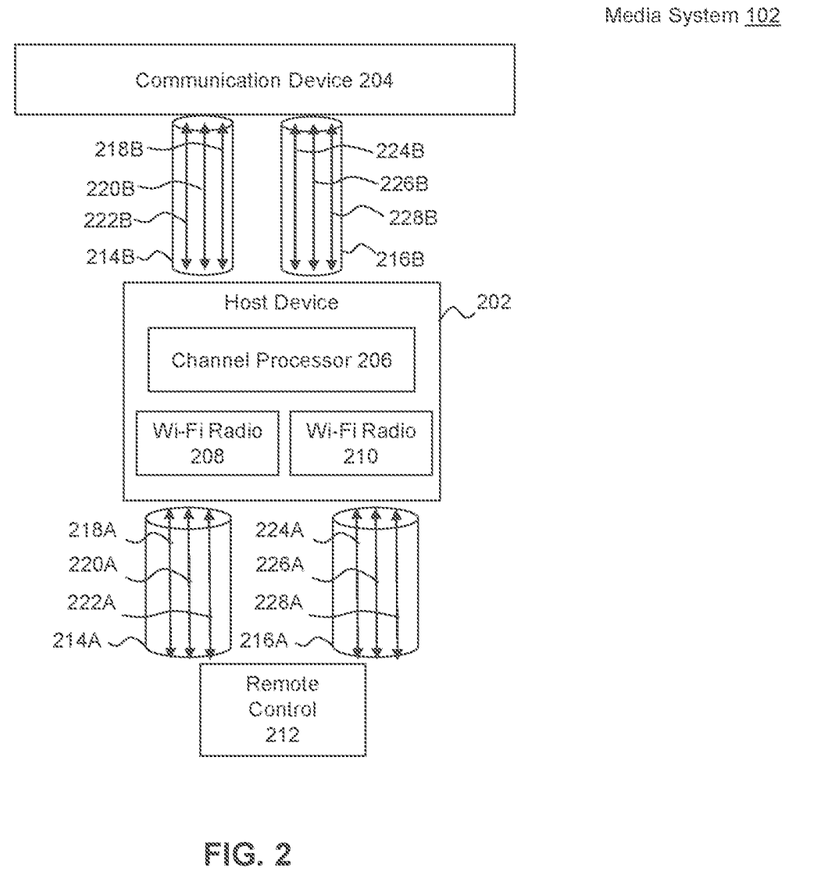
FIG. 2 illustrates a block diagram of a media system, according to some embodiments.

FIG. 2 illustrates a block diagram of an example media system 102, according to some embodiments. Media system 102 may include media device 202, remote control 212A and 212B, and communication device 204. Host device 202 may be an embodiment of any device in media system 102 such as display device 104 or display device 106, remote control 212 may be an embodiment of remote control 110, and communication device 204 may be one embodiment of communication device 132.

Host device 202 may include a channel processor 206 and multiple Wi-Fi radios such as Wi-Fi radio 208 and Wi-Fi radio 210. As an example, Wi-Fi radio 208 may be configured to operate in a first frequency band (e.g., 2.4 GHz) while Wi-Fi radio 210 may be configured to operate in a second frequency band (e.g., 5 GHz). Although depicted with two Wi-Fi radios, host device 202 may include a different number including only one Wi-Fi radio that is configured to operate in either the first or second frequency band. Additionally, although depicted, other devices in media system 102 may include the same or different number of Wi-Fi radios, such as having only one Wi-Fi radio while host device 202 having two Wi-Fi radios.

In embodiments where host device 202 is configured with two Wi-Fi radios, only one radio (and therefore a connection in one frequency band) may be configured at one time. For example, host device 202 may operate either Wi-Fi radio 208 to establish connection 214A in a first frequency band or Wi-Fi radio 210 to establish connection 216A in a second frequency band. Accordingly, while FIG. 2 depicts both connection 214A and connection 216A, it is to be understood that host device 202 may be configured to operate either connection 214A or connection 216A at one time (i.e., not as simultaneous connections). Similarly, although connection 214B and connection 216b are depicted between host device 202 and communication device 204, host device 202 may be configured to operate one connection with communication device 204 at a time.

In an embodiment, host device 202 may be capable of establishing one connection among connection 214A (i.e., via Wi-Fi radio 208) and connection 216A (i.e., via Wi-Fi radio 210) with remote control 212 and one connection among connection 214B (i.e., via Wi-Fi radio 208) and connection 216B (i.e., via Wi-Fi radio 210) with communication device 204. Each of connection 214A, connection 216A, connection 214B, and connection 216B may include multiple selectable channels for transmitting data. For example, connection 214A may include channels 218A, 220A, and 222A, connection 216A may include channels 224A, 226A, and 228A, connection 214B may include channels 218C, 220C, and 214C, and connection 216B may include channels 224C, 226C, and 228C.

As previously noted, three connections per channel is shown merely for illustrative purposes and it is understood that the connections in this disclosure may include any number of channels. For example, the number of channels may depend on the particular frequency band in which the channel operates. In embodiments where connections are established using the same frequency band, the connections may utilize the same channels (i.e., channels that share the same frequency range within the frequency band). For example, connection 214A (between host device 202 and remote control 212) and connection 214C (between host device 202 and communication device 204) may be both be established using Wi-Fi radio 208 in the 2.4 GHz band. In this example, channels 218A, 220A, 222A may be identical to channels 218C, 220C, and 222C, such as channels 1, 6, and 11.

In some embodiments, there may be a requirement for channel separation for connections between host device 202 and communication device 204 and for connections between host device 202 and remote control 212. In other words, channel separation refers to having a separation between a selected channel in the connection between host device 202 and communication device 204 and a selected channel in the connection between host device 202 and remote control 212. If the host device 202 switches a first channel in its connection to communication device 204 to one that is closer to a candidate channel in the connection with remote control 212, the proximity of the first and second channels will necessitate a switch of the second channel in order to obtain optimal separation. For example if the first channel is channel 36 and the second channel is 161, then a switch of the first channel to channel 165 would necessitate a switch of the second channel for optimal performance. This disclosure may refer to the channel that is utilized between host device 202 and communication device 204 as an AP channel and the channel that is utilized between host device 202 and remote control 212 as a P2P channel.

In some embodiments, the amount of the channel separation between channels in different connections may be predefined static amount that may be stored in host device 202 or may be provided remotely from a server. In some embodiments, the amount may be dynamically adjusted based on different factors such as the type of connections of the channels, historical network metrics involving the current or newly selected channels, or current network metrics involving the current or newly selected channels.

Channel processors in devices, such as channel processor 206, may be configured to take preemptive steps to prevent network problems from occurring by dynamically switching between channels within connections as needed based on available network metrics. Channel processor 206 may detect a trigger condition that indicates a channel switch should take place. In some embodiments, the trigger condition may be an external or internal trigger. External triggers refer to conditions that occur outside of a network configuration involving host device 202, such as network conditions of the channels. One example of an external trigger is detecting network congestion conditions such as dropped packets transmitted within one of the channels. Internal triggers refer to conditions changes in network configurations of the host device 202 such as the host device 202 switching from a Wi-Fi to a wired connection with the communication device 204.

Channel processor 206 may identify the channel that is identified by the trigger condition and then identify another channel to perform the channel switch. In some embodiments, channel processor 206 may perform channel switches for P2P channels (i.e., communications with peripheral devices such as remote control 212). In some embodiments, P2P channels may refer to one or more channels that connect the host device 202 with remote control 212 or any other peripheral device such as a wireless speaker or subwoofer. This is in contrast to AP channels which may refer to one or more channels that connect the host device 202 with an access point within home environment 170. In some embodiments, home environment 170 may include more than one access point. Operations of channel processor 206 are discussed further with respect to FIG. 3.

In some embodiments, each channel managed by channel processor 206 may be associated with a channel score which may be considered an estimation of the communication quality of the channel. The channel score may be based on network metrics associated with the channels in the connections that are managed by host device 202. In some embodiments, network metrics excludes metrics associated with network utilization at Wi-Fi radio 208 or Wi-Fi radio 210 because such metrics may fluctuate too quickly to provide a useful evaluation of the channel. Instead, in such embodiments, network metrics may be based on metrics that are more stable. Examples of such network metrics include the number of host devices that are detected on a channel during a channel scan by host device 202 and the number of times a particular channel has been previously selected by host device 202. The number of host devices detected on a channel may reflect an estimate of the busyness of a channel and therefore indirectly indicate potential for network congestion on that channel. Accordingly, the higher number of host devices, the greater the likelihood that the channel would have lower network performance than a channel with a lower number of host devices. The number of visits reflects the number of times that the channel has previously been switched away by host device 202. The higher the number of visits, the more likely that the channel performance is poor because higher number represents the host device having selected the channel but then switched away to another channel. A channel providing higher quality performance would have a fewer number of visits because the host device 202 would stay on that channel for longer without switching to another channel.

Although not depicted, host device 202 may also include one or more audio decoders and one or more video decoders. Each audio decoder may be configured to decode audio of one or more audio formats, such as but not limited to AAC, HE-AAC, AC3 (Dolby Digital), EAC3 (Dolby Digital Plus), WMA, WAV, PCM, MP3, OGG GSM, FLAC, AU, AIFF, and/or VOX, to name just some examples.

Similarly, each video decoder may be configured to decode video of one or more video formats, such as but not limited to MP4 (mp4, m4a, m4v, f4v, f4a, m4b, m4r, f4b, mov), 3GP (3gp, 3gp2, 3 g2, 3gpp, 3gpp2), OGG (ogg, oga, ogv, ogx), WMV (wmy, wma, asf), WEBM, FLV, AVI, QuickTime, HDV, MXF (OP1a, OP-Atom), MPEG-TS, MPEG-2 PS, MPEG-2 TS, WAV, Broadcast WAV, LXF, GXF, and/or VOB, to name just some examples. Each video decoder may include one or more video codecs, such as but not limited to H.263, H.264, HEV, MPEG1, MPEG2, MPEG-TS, MPEG-4, Theora, 3GP, DV, DVCPRO, DVCPRO, DVCProHD, IMX, XDCAM HD, XDCAM HD422, and/or XDCAM EX, to name just some examples.

Figure 3:
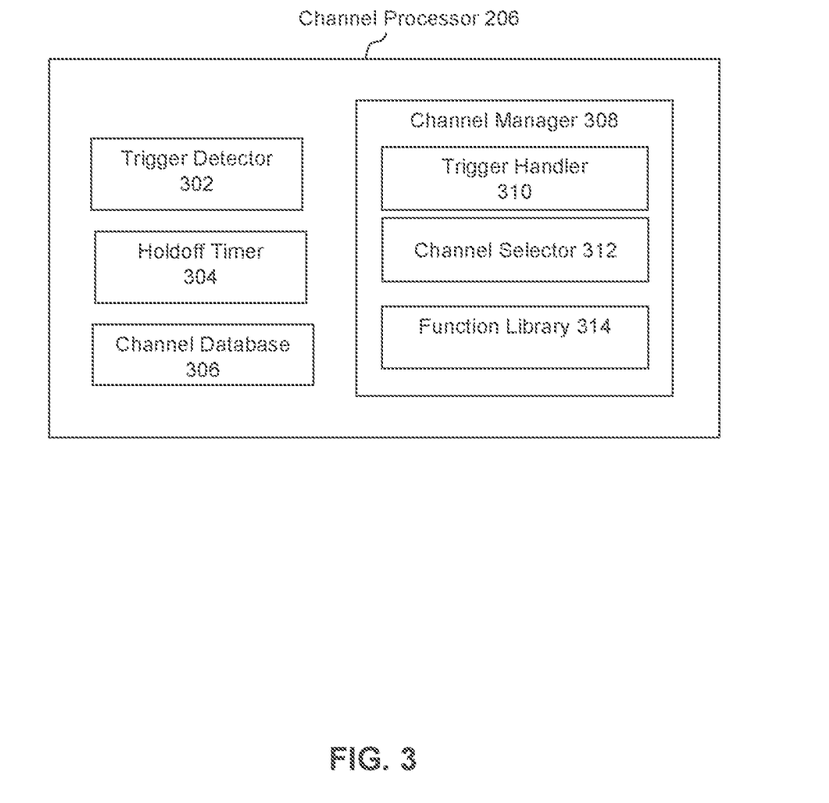
FIG. 3 illustrates a block diagram of a channel processor, according to some embodiments.

FIG. 3 illustrates a block diagram of a channel processor 206, according to some embodiments. Channel processor 206 may include trigger detector 302, holdoff timer 304, channel database 306, and channel manager 308. Channel manager 308 may include trigger handler 310, channel selector 312, and function library 314.

Trigger detector 302 may be configured to detect or otherwise receive conditions that may trigger a channel switch from a current channel managed by channel processor 206. Conditions that may trigger a channel switch may be considered either external triggers or internal triggers. External triggers may be conditions that are received from an external entity and related to conditions outside of network configurations such as a network interface or channel. Examples of external triggers are on boot of the host device 202, resuming the host device 202 from a suspend mode, or requests from entities external to channel processor 206 such as dropped packets between the host device 202 and remote control 212. Examples of dropped packets may include dropped audio packets and dropped control packets. Booting the host device 202 or resuming the host from a suspend mode may initiate a channel switch operation where the channel processor 206 selects a new P2P channel when the host device 202 is booted or resumed.

Internal triggers may be conditions that reflect changes in network configurations of host device 202. One example of an internal trigger include a change in the network interface of host device 202 such as from a Wi-Fi connection to a wired connection (e.g., to communication device 230), or vice versa. A change from a Wi-Fi connection to a wired connection between host device 202 and communication device 230 may cause channel processor 206 to evaluate whether to switch the P2P channel between host device 202 and remote control 212. In embodiments where host device 202 includes a single Wi-Fi radio, the P2P channel has to be the same as the AP channel if host device 202 is connected over WiFi to communication device 230. Upon switching to a wired connection to the communication device 230, the host device 202 may now free to choose a more suitable P2P channel since it can now use any of the available channels in any supported frequency.

As another example, the requirement of channel separation may have caused the selection of a particular P2P channel (e.g., channel 35) that was the required distance (in terms of channels) from the AP channel used between host device 202 and communication device 230 (e.g., channel 161). In this example, with host device 202 now utilizing a wired connection, host device 202 may be able to select a better channel (e.g., channel 165) for the P2P channel that could not have been selected previously because it was too close to the AP channel. Conversely, when host device 202 switches to a Wi-Fi connection with communication device 230, channel processor 206 may evaluate whether a channel switch for the P2P channel is needed in order to meet the requirements of channel separation.

In a similar manner, another example of an internal trigger is a change in the AP channel when a Wi-Fi connection is being utilized. When an AP channel is changed (e.g., due to a change initiated by communication device 23), channel processor 206 evaluates whether the new AP channel requires a change in the P2P channel due to channel separation requirements or other network performance considerations.

Holdoff timer 304 may be implemented based on considerations involving certain peripheral devices in media system 102. Holdoff timer 304 implements a holdoff time during which a P2P channel may not be switched more than a predetermined time period (e.g., once every 30 minutes). In some embodiments, certain peripheral devices, such as remote control 212 may be configured with a power-saving mode. When not in use, remote control 212 wakes up at a predetermined wake-up interval (e.g., once every 30 minutes) and attempts to connect to the host device 202.

The purpose of the holdoff time is to prevent remote control 212 from having to perform a channel scan and establish a new connection with host device 202 which would increase latency by the remote control 212 in responding to user inputs. Accordingly, the holdoff time may be the same as or longer than the predetermined wake-up interval. Consider an example where the holdoff time is 15 minutes and remote control 212 is initially connected to host device 202 via channel 1. The host device 202 performs a channel switch to channel 6 after 15 minutes while remote control 212 is asleep. When remote control 212 wakes up to connect to host device 202 after 30 minutes, the remote control 212 can no longer connect to host device 202 via channel 1. Accordingly, the remote control 212 must perform a channel scan and connect to the new channel, channel 6. This process may increase latency of user inputs to the remote control 212. And, in some embodiments, it is undesirable to shorten the sleep mode of remote control 212 because it would negatively impact battery life.

Holdoff timer 304 manages the holdoff time and would disallow any P2P channel switch requests. In some embodiments, holdoff timer 304 may implement certain exceptions and allow P2P channel switches for specific conditions. Channel switches during this conditions may be allowed in order to maintain performance of host device 202 such as upon boot of the host device 202, upon resuming from suspend mode, and upon a change in the AP channel.

Channel database 306 may store all available channels that may be selected by host device 202. In some embodiments, available channels may be determined based on geographic region in which host device 202 is located. Channel database 306 may also store channel information such as the channel scores for each channel. Channel manager 308 may communicate with channel database 306 via a function call and retrieve available channels during a channel switch operation.

Channel manager 308 may perform functions for the channel switch operation such as retrieving available channels from channel database 306, pruning the channel list based on predetermined criteria, and selecting a new channel for performing a channel switch operation. The functions may be implemented by trigger handler 310, channel selector 312, and function library 314.

Trigger handler 310 may receive conditions associated with network configurations of host device 202 and from external devices such as with regard to network conditions. Trigger handler 310 may determine whether the received conditions meet criteria for triggering a channel switch of, for example, the current P2P channel. Trigger handler 310 may then send a signal to channel selector 312 to proceed with the channel switch operation if a trigger condition is detected.

Upon receiving the channel switch signal from trigger handler 310, channel selector 312 may initiate steps for performing the channel switch starting with retrieving all available channels for a connection from channel database 306. From this list of available channels, channel selector 312 may then prune candidates from the list based on certain channel criteria such as removing the current P2P channel from the list and removing reserved channels such as dynamic frequency selection ("DFS") channels which are generally reserved for radar or military applications. Other criteria for removing channels may be based on hardware resources of host device 202. Some media devices such as those with a single Wi-Fi radio and no Ethernet connection may not be able to select P2P channels. Other hardware limitations may be Wi-Fi radios that do not support certain frequency bands and therefore cannot support certain channels. Yet additional criteria may be based on a predefined channel separation between AP and P2P channels. In some embodiments, channels that are within the predefined channel separation may be removed from the list and prevented from being selected. In some embodiments, the predefined channel separation may be stored in memory or may default to a specific number (e.g., 16). After pruning the list of channel candidates, channel selector 312 may then select a channel from the remaining channels based on the best channel score. In some embodiments, the list of channel candidates may include a plurality of channel scores with each channel score corresponding to a respective channel candidate in the list of candidates. The best channel score may be identified based on the channel score having the highest value compared to the values of other channel scores in the list of channel candidates. The channel score represents a metric for evaluating the reliability of the connection provided by the channel. For example, channel selector 312 may identify the channel with the highest channel score based on a comparison of the channels in the plurality of channel scores.

Function library 314 includes functions that may be called by channel selector 312 for implementing the channel switch operation such as a function for retrieving available channels from the channel database 306, setting a new current P2P channel in a component of a state machine (not shown), and connecting to the communication device 230.

Embodiments of Dynamically Switching Channels in a Private Network

Figure 4:
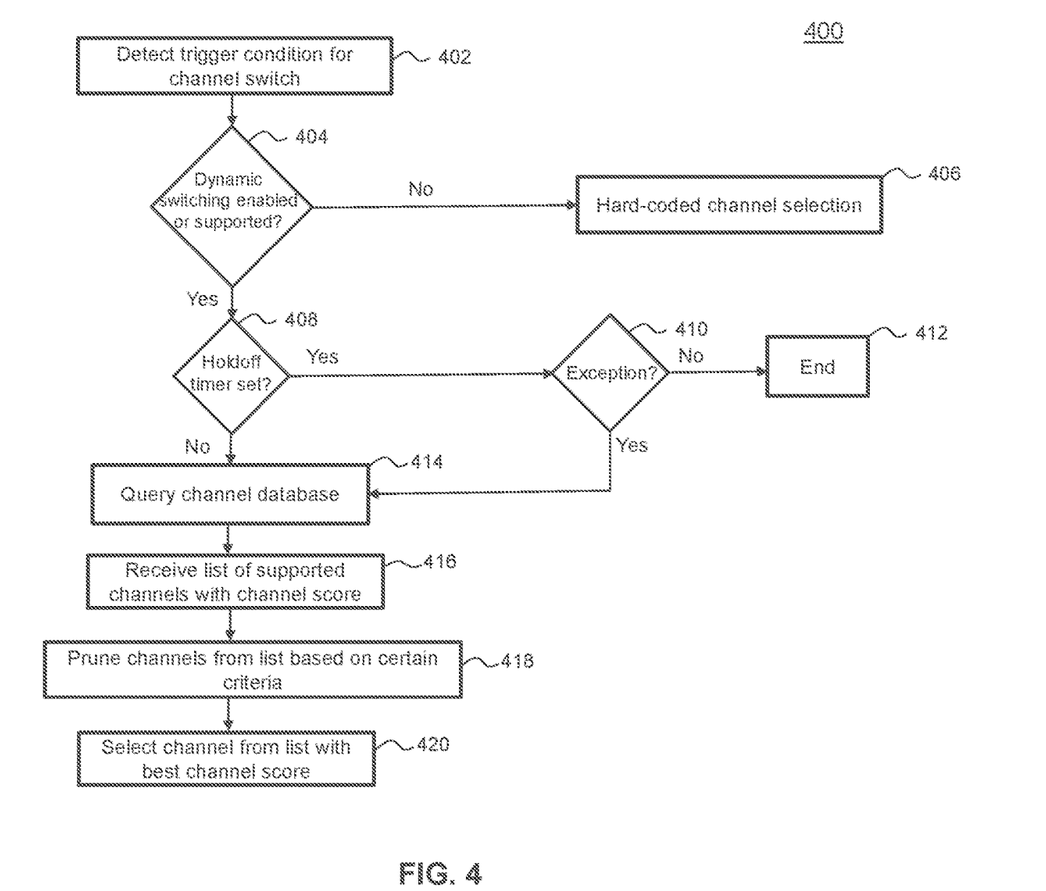
FIG. 4 is a flowchart for dynamically switching channels in a media environment, according to some embodiments.

FIG. 4 is a flowchart illustrating a method 400 for performing a dynamic channel switch within a private network, according to some embodiments. As a non-limiting example with regards to FIGS. 1-3, one or more processes described with respect to FIG. 4 may be performed by any host device within a media system 102 such as a media device (e.g., media device 106 of FIG. 1) or a display device (e.g., display device 104 of FIG. 1). In such an embodiment, any of these devices may execute code in memory to perform certain steps of method 400 of FIG. 4. While method 400 of FIG. 4 will be discussed below as being performed by host device 202, other devices or components may store the code and therefore may execute method 400 by directly executing the code. For example, channel processor 206 of host device 202 may perform some of or all of the steps. Accordingly, the following discussion of method 400 will refer to devices of FIGS. 1 and 2 as an exemplary non-limiting embodiment of method 400. Moreover, it is to be appreciated that not all steps may be needed to perform the disclosure provided herein. Further, some of the steps may be performed simultaneously or in a different order than shown in FIG. 4, as will be understood by a person of ordinary skill in the art.

In 402, host device 202 may detect a trigger condition for performing a channel switch operation. As discussed above, in some embodiments, a trigger condition may comprise one or more of an internal or external trigger. Non-limiting examples of internal triggers include changes to the media environment of host device 202 such as changes to conditions of host device 202 such as a bootup condition of host device 202 and host device 202 resuming from a suspend mode. Non-limiting examples of external triggers may include detected network conditions such as packet drops that occur within one or more channels in which host device 202 is transmitted data, such as to remote control 212.

In 404, host device 202 may determine whether dynamic switching is either enabled or supported. If not, host device 202 proceeds to 406 where a hard-coded channel switching operation is performed. If yes, host device 202 proceeds to 408 and initiates the steps for performing dynamic channel switching.

In 406, host device 202 performs the hard-coded channel switching operation which may be preconfigured in a memory of host device 202. In some embodiments, the hard-coded channel switching operation may be initiated upon detection of certain conditions. Examples of these conditions include on detection of a network interface change or on detection of a Wi-Fi channel change (i.e., when the communication device 230 changes the channel of communication to host device 202).

On detection of the network interface change, if the new interface is a wired connection, then host device 202 may determine if any of its Wi-Fi radios supports the 5 GHZ frequency band. If so, host device 202 may automatically select a predefined channel associated with that frequency band (e.g., channel 36). If not, host device 202 may automatically select another predefined channel (e.g., channel 6). If the new interface is a Wi-Fi connection, host device 202 may proceed with the steps associated with detecting the Wi-Fi channel change. These steps include first determining whether host device 202 includes two Wi-Fi radios. If not, host device 202 automatically uses the current AP channel. If yes, then host device 202 automatically selects a channel based on the current AP channel. In an embodiment, the P2P channel may be selected based on whether the current AP channel falls within a predetermined range of channels. As one non-limiting example, if the current AP channel is less than 14, then host device 202 may automatically select a predetermined channel (e.g., channel 36), if the current AP channel is between 14 and 48, then host device 202 may select another predetermined channel (e.g., channel 149), and if the current channel is anything greater than 48, then host device 202 may select another predetermined channel (e.g., channel 36).

In 408, when host device 202 determines that dynamic channel switching is either enabled or supported, then host device 202 may next determine if holdoff timer 304 is set which means that the host device 202 is prevented from switching channels to prevent miscommunication from any peripherals that are currently in sleep mode. If yes, host device 202 may determine if an exception is present to override the holdoff timer 304 being set at 410. If no, then host device 202 proceeds to the next step of the dynamic channel switching operation at 414.

In 410, host device 202 has determined that the holdoff timer 304 has been set and may next determine whether any specific exceptions are present to override the holdoff timer 304 and allow the channel switching to take place. Examples of exceptions are device conditions such as on bootup or on resuming from a suspend state and network configuration conditions such as changes in a network interface or change in the AP channel. If an overriding exception is present, then host device 202 proceeds to the next step of the dynamic channel switching operation at 414. If one is not present, then host device 202 prevents a channel switch from occurring and ends at 412.

In 414, host device 202 has determined that it may proceed with switching the channels and queries channel database 306 for all available channels that are supported for performing the channel switch.

In 416, host device 202 receives the list of supported channels from channel database 306. The list also includes channel scores for each of the channels. As noted above, in some embodiments, available channels in the list may be determined based on geographic region in which host device 202 is located. For example, only certain channels may be supported in certain geographic regions. Host device 202 may determine its geographic region based on the IP address or based on a user-specific setting.

In 418, host device 202 prunes the list of supported channels by removing channels based on certain criteria that may indicate channels that are not candidates for the channel switch. Examples of this criteria include whether the channels are DFS channels and the current P2P channel. For example, channel selector 312 of host device 202 may prune candidate channels from the list based on certain channel selection criteria such as removing the current P2P channel from the list and removing reserved channels such as dynamic frequency selection ("DFS") channels which are generally reserved for radar or military applications. Other criteria for removing channels may be based on hardware resources of host device 202 such as the type of Wi-Fi chip installed in the host device 202. For example, different Wi-Fi chips may or may not support different frequency bands and therefore cannot support certain channels of those frequency bands. Some media devices such as those with a single Wi-Fi radio and no Ethernet connection may not be able to select P2P channels. Yet additional criteria for channel selection may be to select channels based on a predefined channel separation value between the current channel used by the media device to communicate with the access point (AP channel) and the channels used by the media device to communicate with peripheral devices, like remote control 212 (P2P channel). For example, host device 202 may prune candidate channels that are within the predefined channel separation value of the current AP channel. In some embodiments, the predefined channel separation may be stored in memory or may default to a specific number (e.g., 16).

In 420, host device 202 selects, from the remaining channels, a channel with the best channel score as the channel to switch the current P2P channel.

Figure 5:
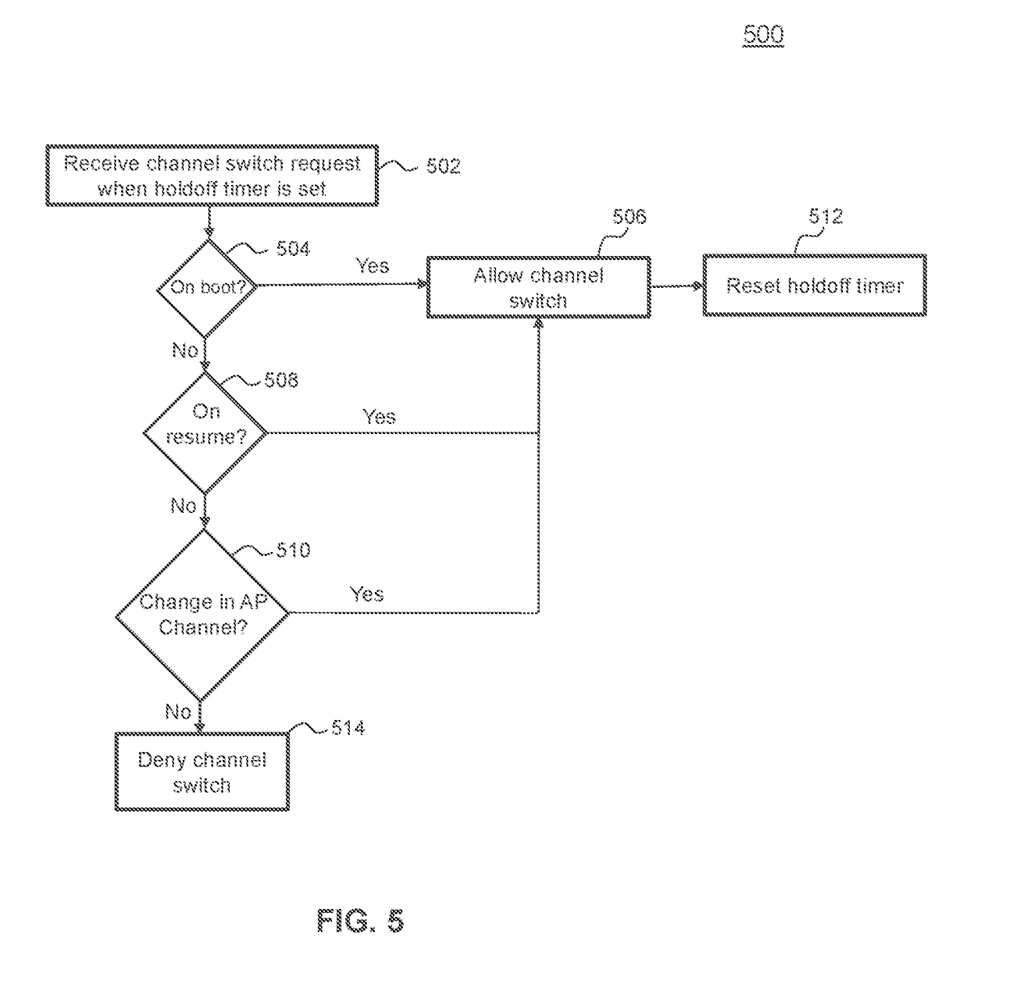
FIG. 5 is a flowchart for processing a channel switch using a holdoff timer, according to some embodiments.

FIG. 5 is a flowchart illustrating a method 500 for allowing or denying a channel switch based on a holdoff timer, according to some embodiments. As a non-limiting example with regards to FIGS. 1-3, one or more processes described with respect to FIG. 5 may be performed by any host device within a media system 102 such as a media device (e.g., media device 106 of FIG. 1) or a display device (e.g., display device 104 of FIG. 1). In such an embodiment, any of these devices may execute code in memory to perform certain steps of method 500 of FIG. 5. While method 500 of FIG. 5 will be discussed below as being performed by host device 202, other devices or components may store the code and therefore may execute method 500 by directly executing the code. For example, channel processor 206 of host device 202 may perform some of or all of the steps. Accordingly, the following discussion of method 500 will refer to devices of FIGS. 1 and 2 as an exemplary non-limiting embodiment of method 500. Moreover, it is to be appreciated that not all steps may be needed to perform the disclosure provided herein. Further, some of the steps may be performed simultaneously or in a different order than shown in FIG. 5, as will be understood by a person of ordinary skill in the art.

In 502, host device 202 has determined that a channel switch request has been received when holdoff timer 304 has been set (e.g., 408 of FIG. 4). Host device 202 next determines whether the detected condition is an exception that overrides the holdoff timer 304.

In 504, host device 202 determines whether the detected condition is a boot up of host device 202 (e.g., from a reset). Boot conditions permit a channel switch to occur since the host device 202 must establish a new connection (i.e., new AP channel) with communication device 230. Instead of using the last P2P connection, host device 202 may be permitted to determine whether a better channel is available upon booting. Accordingly, if host device 202 is booting, then a channel switch is allowed at 506 (e.g., 414-420). If not, host device 202 proceeds to 508.

In 508, host device 202 determines whether the detected condition is host device 202 resuming from a suspend mode (e.g., sleep). Resuming conditions permit a channel switch for similar reasons that it is allowed for boot conditions. Host device 202 must establish a new AP channel with communication device 230 and rather than requiring host device 202 to utilize the last stored P2P connection, host device 202 may be permitted to determine whether a better channel is available upon resuming. Accordingly, if host device 202 is booting, then a channel switch is allowed at 506 (e.g., 414-420). If not, host device 202 proceeds to 510.

In 510, host device 202 determines whether the detected condition is a network change. In some embodiments, the network change is a change in the AP channel between host device 202 and communication device 230. AP channel changes permit a channel switch to occur because host device 202 may need to change the P2P channel due to channel separation and other requirements. That is, if the new AP channel is within the range of the channel separation requirement to the current P2P channel, then host device 202 may be required to switch the current P2P channel. If there is a change in the AP channel, then a channel switch is allowed at 506 (e.g., 414-420). If not, no other conditions are permitted to allow a channel switch and therefore host device 202 denies the channel switch request at 514. In some embodiments, the network change is an interface change (e.g. Wi-Fi to wired) which may also be considered an internal trigger. For example, the interface change from a wired connection to a Wi-Fi connection may be considered an AP channel change because as soon as the Wi-Fi connection is established, the communication device 230 selects a channel for the connection.

In 512, after the channel switch has been performed, host device 202 may reset the holdoff timer at 512.

Figure 6:
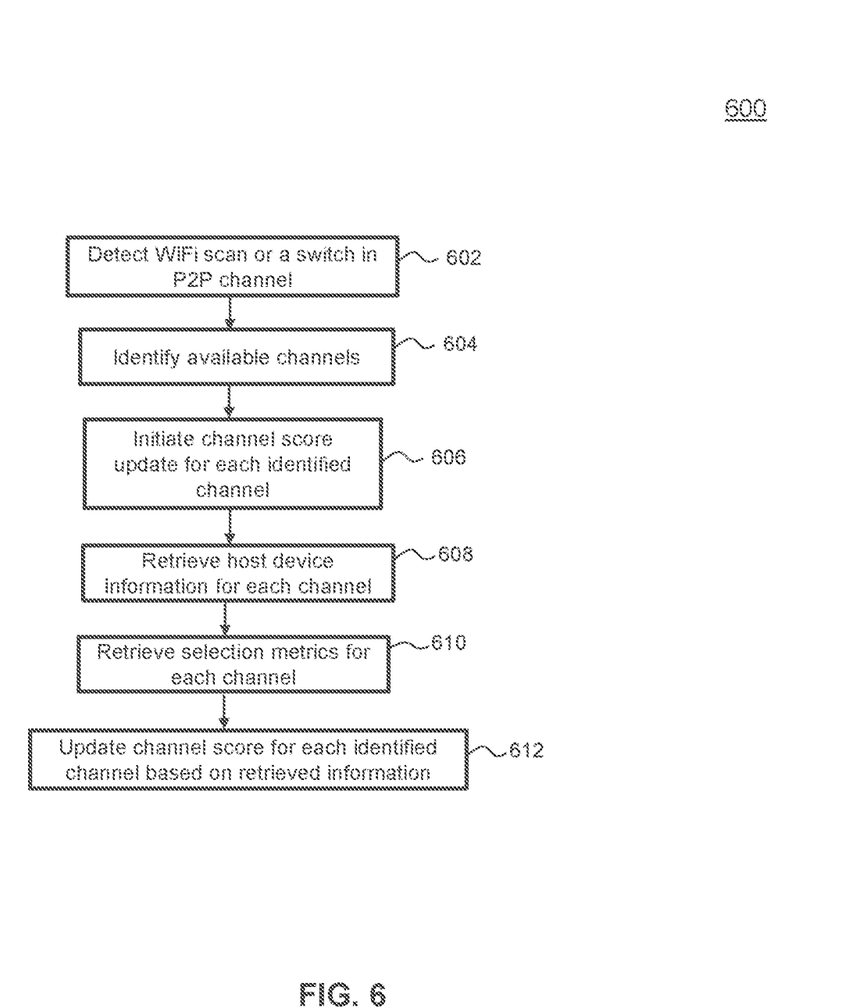
FIG. 6 is a flowchart illustrating updating a channel score for channels, according to some embodiments.

FIG. 6 is a flowchart illustrating a method 600 for updating a channel score of a channel, according to some embodiments. As a non-limiting example with regards to FIGS. 1-3, one or more processes described with respect to FIG. 6 may be performed by any host device within a media system 102 such as a media device (e.g., media device 106 of FIG. 1) or a display device (e.g., display device 104 of FIG. 1). In such an embodiment, any of these devices may execute code in memory to perform certain steps of method 400 of FIG. 4. While method 600 of FIG. 6 will be discussed below as being performed by host device 202, other devices or components may store the code and therefore may execute method 600 by directly executing the code. For example, channel processor 206 of host device 202 may perform some of or all of the steps. Accordingly, the following discussion of method 600 will refer to devices of FIGS. 1 and 2 as an exemplary non-limiting embodiment of method 600. Moreover, it is to be appreciated that not all steps may be needed to perform the disclosure provided herein. Further, some of the steps may be performed simultaneously or in a different order than shown in FIG. 6, as will be understood by a person of ordinary skill in the art.

In 602, host device 202 may detect a Wi-Fi scan is being performed or that a switch has occurred to a new P2P channel which may prompt the channel score update operation.

In 604, host device 202 may identify all available channels such as by retrieving the channels from channel database 306.

In 606, host device 202 may initiate the channel score update for each identified channel.

In 608, host device 202 may retrieve access point information for each channel. Examples of host device information may include the number of host devices that are currently using the channel and may include channel information shared between host devices that are located on the same network, such as in home environment 170. Channel information between host devices may provide a host device more visibility into the performance of a channel and provide more efficiency during the channel scan process. For example, upon boot, host device 202 may start without any knowledge of the current channels in home environment 170. Host device 202 may receive channel information from one or more host devices in home environment 170 which may jumpstart the channel switching process for host device 202 and allow host device 202 to more quickly and efficiently select the best channel.

In 610, host device 202 may retrieve selection metrics associated with each channel. Examples of selection metrics include the number of times that host device 202 has switched away from the channel. This metric may indicate that the channel has poor performance which caused the host device 202 to switch to another channel. In some embodiments, host device 202 may receive selection metrics from other host devices in home environment 170 and combine that information with the selection metrics of host device 202 to provide more information about particular channels.

In 612, host device 202 may then generate or update a channel score for each channel based on the host device information and the selection metrics. In some embodiments, the channel score may be based on a combination of the host device information and the selection metrics. In some embodiments, where the host device information includes the number of host devices located on the channel and where the selection metrics includes the number of switches that have occurred on the channel, host device 202 may generate a channel score for a particular channel based on the following algorithm:
1. If the number of host devices on the channel is equal to zero, then the channel score is set to the number of switches;
2. If the number of switches for the channel is equal to zero, then the channel score is set to the number of host devices; and
3. For all other values of the number of host devices and the number of switches, then the channel score is set to the number of host devices multiplied by the number of switches.

It is understood that the algorithm is merely on example for how a channel score may be generated and that the channel score may be generated based on other types of host device information and other selection metrics as long as the channel score is generated to reflect an estimation of the quality of the channel such as the likelihood that the channel would be congested or that communications through the channel would otherwise be delayed.

Example Computer System

Figure 7:
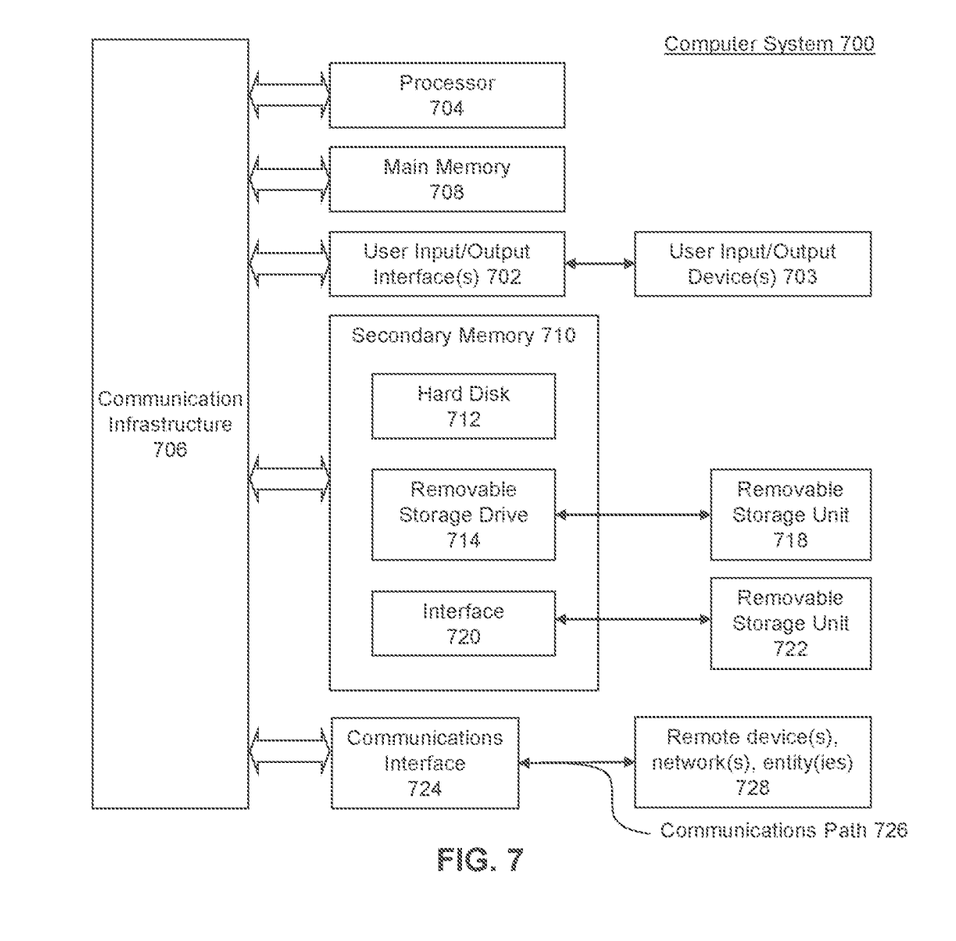
FIG. 7 illustrates an example computer system useful for implementing various embodiments.

Various embodiments may be implemented, for example, using one or more well-known computer systems, such as computer system 700 shown in FIG. 7. For example, the media device 106 may be implemented using combinations or sub-combinations of computer system 700. Also or alternatively, one or more computer systems 700 may be used, for example, to implement any of the embodiments discussed herein, as well as combinations and sub-combinations thereof.

Computer system 700 may include one or more processors (also called central processing units, or CPUs), such as a processor 704. Processor 704 may be connected to a communication infrastructure or bus 706.

Computer system 700 may also include user input/output device(s) 703, such as monitors, keyboards, pointing devices, etc., which may communicate with communication infrastructure 706 through user input/output interface(s) 702.

One or more of processors 704 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 700 may also include a main or primary memory 708, such as random access memory (RAM). Main memory 708 may include one or more levels of cache. Main memory 708 may have stored therein control logic (i.e., computer software) and/or data.

Computer system 700 may also include one or more secondary storage devices or memory 710. Secondary memory 710 may include, for example, a hard disk drive 712 and/or a removable storage device or drive 714. Removable storage drive 714 may be a floppy disk drive, a magnetic tape drive, a compact disk drive, an optical storage device, tape backup device, and/or any other storage device/drive.

Removable storage drive 714 may interact with a removable storage unit 718. Removable storage unit 718 may include a computer usable or readable storage device having stored thereon computer software (control logic) and/or data. Removable storage unit 718 may be a floppy disk, magnetic tape, compact disk, DVD, optical storage disk, and/any other computer data storage device. Removable storage drive 714 may read from and/or write to removable storage unit 718.

Secondary memory 710 may include other means, devices, components, instrumentalities or other approaches for allowing computer programs and/or other instructions and/or data to be accessed by computer system 700. Such means, devices, components, instrumentalities or other approaches may include, for example, a removable storage unit 722 and an interface 720. Examples of the removable storage unit 722 and the interface 720 may include a program cartridge and cartridge interface (such as that found in video game devices), a removable memory chip (such as an EPROM or PROM) and associated socket, a memory stick and USB or other port, a memory card and associated memory card slot, and/or any other removable storage unit and associated interface.

Computer system 700 may further include a communication or network interface 724. Communication interface 724 may enable computer system 700 to communicate and interact with any combination of external devices, external networks, external entities, etc. (individually and collectively referenced by reference number 728). For example, communication interface 724 may allow computer system 700 to communicate with external or remote devices 728 over communications path 726, which may be wired and/or wireless (or a combination thereof), and which may include any combination of LANs, WANs, the Internet, etc. Control logic and/or data may be transmitted to and from computer system 700 via communication path 726.

Computer system 700 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 700 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 700 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 700, main memory 708, secondary memory 710, and removable storage units 718 and 722, as well as tangible articles of manufacture embodying any combination of the foregoing. Such control logic, when executed by one or more data processing devices (such as computer system 700 or processor(s) 704), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 7. In particular, embodiments can operate with software, hardware, and/or operating system implementations other than those described herein.

CONCLUSION

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method performed by a media device for performing a dynamic channel switch within a private network, the method comprising:
   detecting a trigger condition for performing a channel switch operation, wherein the media device is configured to communicate with a peripheral device over a currently selected channel of a plurality of channels, and wherein the plurality of channels further includes a predefined channel and a candidate channel;
   determining whether the media device is configured for performing the dynamic channel switch for the channel switch operation, wherein the dynamic channel switch is based on a channel score associated with the candidate channel;

responsive to the media device not being configured for performing the dynamic channel switch, performing a hard-coded channel switch to switch the media device from the currently selected channel to the predefined channel, wherein in performing the hard-coded channel switch, the method further comprises retrieving, by the media device, the predefined channel from a channel database; and responsive to the media device being configured for performing the dynamic channel switch:
identifying the candidate channel based on the channel score associated with the candidate channel; and
performing the dynamic channel switch to switch the media device from the currently selected channel to the candidate channel.

2. The method of claim 1, wherein the peripheral device is a remote control.

3. The method of claim 1, wherein the trigger condition comprises any one of an internal trigger reflecting a change in a network configuration of the media device or an external trigger reflecting a change in a non-network configuration of the media device.

4. The method of claim 3, wherein the network configuration comprises a network interface of the media device or an access point channel connecting the media device to an access point.

5. The method of claim 3, wherein the non-network configuration comprises any one of a boot status of the media device, a suspend status of the media device, and a network condition of packets transmitted via the currently selected channel.

6. The method of claim 1, wherein the channel database is a component of the media device.

7. The method of claim 1, wherein in performing the dynamic channel switch, the method further comprises:
determining, by the media device, whether a holdoff timer is set;
responsive to the holdoff timer being set:
responsive to determining that an override exception is present, permitting the dynamic channel switch to proceed; and
responsive to determining that the override exception is not present, ending the channel switch operation without performing the dynamic channel switch; and
responsive to the holdoff timer not being set, permitting the dynamic channel switch to proceed.

8. The method of claim 7, wherein the override exception comprises any one of a bootup condition of the media device, a resume condition of the media device, a network change condition, or a channel change condition.

9. The method of claim 7, wherein responsive to the dynamic channel switch being permitted to proceed, the method further comprises:
retrieving, by the media device from the channel database, a list of available channels for the dynamic channel switch, wherein the list of available channels includes the plurality of channels including the currently selected channel and the candidate channel and wherein the list of available channels further includes a plurality of channel scores associated with the plurality of channels, wherein the plurality of channel scores comprises a first channel score associated with the currently selected channel and the channel score associated with the candidate channel;
pruning the list of available channels based on a selection criteria associated with the media device; and
selecting the candidate channel based on the channel score based on a comparison between the channel score and remaining channel scores in the plurality of channel scores.

10. The method of claim 9, wherein the selection criteria includes any one of a reserved channel criteria, a hardware resource criteria, and a channel separation criteria.

11. A media device for performing a dynamic channel switch within a private network, the media device comprising:
at least one processor configured to perform operations comprising:
detecting a trigger condition for performing a channel switch operation, wherein the media device is configured to communicate with a peripheral device over a currently selected channel of a plurality of channels and wherein the plurality of channels further includes a predefined channel and a candidate channel;
determining whether the media device is configured for performing the dynamic channel switch for the channel switch operation, wherein the dynamic channel switch is based on a channel score associated with the candidate channel;
responsive to the media device not being configured for performing the dynamic channel switch, performing a hard-coded channel switch to switch the media device from the currently selected channel to the predefined channel, wherein in performing the hard-coded channel switch, the operations further comprises retrieving, by the media device, the predefined channel from a channel database; and
responsive to the media device being configured for performing the dynamic channel switch:
identifying the candidate channel based on the channel score associated with the candidate channel; and
performing the dynamic channel switch to switch the media device from the currently selected channel to the candidate channel.

12. The media device of claim 11, wherein the peripheral device is a remote control.

13. The media device of claim 11, wherein the trigger condition comprises any one of an internal trigger reflecting a change in a network configuration of the media device or an external trigger reflecting a change in a non-network configuration of the media device.

14. The media device of claim 13, wherein the network configuration comprises a network interface of the media device or an access point channel connecting the media device to an access point.

15. The media device of claim 13, wherein the non-network configuration comprises any one of a boot status of the media device, a suspend status of the media device, and a network condition of packets transmitted via the currently selected channel.

16. The media device of claim 11, wherein the channel database is a component of the media device.

17. The media device of claim 11, wherein in performing the dynamic channel switch, the operations further comprise:
determining, by the media device, whether a holdoff timer is set;

responsive to the holdoff timer being set:
- responsive to determining that an override exception is present, permitting the dynamic channel switch to proceed; and
- responsive to determining that the override exception is not present, ending the channel switch operation without performing the dynamic channel switch; and responsive to the holdoff timer not being set, permitting the dynamic channel switch to proceed.

18. A non-transitory computer-readable medium having instructions stored thereon that, when executed by a media device, cause the media device to perform operations for performing a dynamic channel switch within a private network, the operations comprising:

- detecting a trigger condition for performing a channel switch operation, wherein the media device is configured to communicate over a currently selected channel of a plurality of channels and wherein the plurality of channels further includes a predefined channel and a candidate channel;
- determining whether the media device is configured for performing the dynamic channel switch for the channel switch operation, wherein the dynamic channel switch is based on a channel score associated with the candidate channel;
- responsive to the media device not being configured for performing the dynamic channel switch, performing a hard-coded channel switch to switch the media device from the currently selected channel to the predefined channel, wherein in performing the hard-coded channel switch, the operations further comprises retrieving, by the media device, the predefined channel from a channel database;
- responsive to the media device being configured for performing the dynamic channel switch:
  - identifying the candidate channel based on the channel score associated with the candidate channel; and
  - performing the dynamic channel switch to switch the media device from the currently selected channel to the candidate channel.

* * * * *